(12) United States Patent
Kieffer et al.

(10) Patent No.: US 10,247,619 B2
(45) Date of Patent: Apr. 2, 2019

(54) RESISTANCE TEMPERATURE DETECTOR WITH MEDIUM TEMPERATURE COEFFICIENT AND HIGH LINEARITY

(71) Applicant: Vishay Measurements Group, Inc., Wendell, NC (US)

(72) Inventors: Thomas P. Kieffer, Wake Forest, NC (US); Robert B. Watson, Clayton, NC (US)

(73) Assignee: VISHAY MEASUREMENTS GROUP, INC., Wendell, NC (US)

( * ) Notice: Subject to any disclaimer, the term of this patent is extended or adjusted under 35 U.S.C. 154(b) by 363 days.

(21) Appl. No.: 14/702,262

(22) Filed: May 1, 2015

(65) Prior Publication Data

US 2016/0320251 A1    Nov. 3, 2016

(51) Int. Cl.
*G01K 7/18*    (2006.01)

(52) U.S. Cl.
CPC ..................................... *G01K 7/18* (2013.01)

(58) Field of Classification Search
CPC ............ G01K 7/02; G01K 7/22; G01K 13/02; G01K 2205/04; G01K 2013/024; G01K 11/3206; G01K 2011/324; H01R 4/023; H01R 4/029; H01R 43/28; B23K 31/02; G01N 25/72; H02M 1/32; H02M 1/38; H02M 1/53806
See application file for complete search history.

(56) References Cited

U.S. PATENT DOCUMENTS

| 3,991,613 | A | * | 11/1976 | Adler | G01F 1/3263 |
| | | | | | 73/861.22 |
| 4,037,463 | A | * | 7/1977 | Arakawa | G01K 3/06 |
| | | | | | 374/116 |
| 4,841,273 | A | * | 6/1989 | Horton | G01K 7/18 |
| | | | | | 374/149 |
| 8,305,186 | B1 | | 11/2012 | Myers | |

FOREIGN PATENT DOCUMENTS

| DE | 102004063207 A1 | 7/2006 |
| GB | 1245604 A | 9/1971 |
| GB | 1578830 A | 11/1980 |

OTHER PUBLICATIONS

"Temperature Sensors and LST Networks" www.micro-measurements.com Document No. 11522; Revised Feb. 4, 2010.
International Search Report PCT/US2016/029931 dated Jul. 29, 2016.

* cited by examiner

*Primary Examiner* — Manish S Shah
(74) *Attorney, Agent, or Firm* — Volpe and Koenig, P.C.

(57) ABSTRACT

A resistance temperature detector (RTD) includes a temperature sensing circuit with a conductive element to receive an input signal and produce an output signal that is a function of temperature. The conductive element is formed from a metal having a temperature coefficient of resistance from about 10 ppm/° F. to about 1000 ppm/° F.

18 Claims, 2 Drawing Sheets

RESISTANCE TEMPERATURE DETECTOR WITH MEDIUM TEMPERATURE COEFFICIENT AND HIGH LINEARITY

FIELD OF INVENTION

The present invention generally relates to temperature sensors, and more particularly, relates to temperature sensing with a Resistance Temperature Detector.

BACKGROUND

A Resistance Temperature Detector (RTD) senses an environmental temperature by detecting changes in the electrical characteristics of the sensing circuit in the RTD. The sensing circuit typically includes a metallic wire or metallic film with a known electrical resistance that changes depending on the temperature sensed by the RTD. This relationship between the electrical characteristics of the RTD and temperature change are known. Conventional RTDs include leads that are connected to an external device to provide an electrical signal to the RTD and to provide a conditioning circuit for electrical signal in response from the RTD so that it can be converted to a temperature measurement.

The conditioning circuit is used to linearize the response signal, attenuate the response signal, or both linearize and attenuate the response signal to provide a readable signal that can be correlated to a temperature. In some applications, it is desirable to read an RTD directly, without a conditioning circuit. Known RTDs produce a non-linear response or a have a large response to small inputs, which preclude direct reading of the output signal.

Accordingly, a need exists for an RTD that produces a linear response to temperature change that is within the scale of direct read instrumentation.

SUMMARY

The RTD of the present invention comprises a temperature sensing circuit having a conductive element that receives an input signal and outputs a signal that is a function of temperature. The preferred conductive element is formed from a metal having a temperature coefficient of resistance from about 10 ppm/° F. to about 1000 ppm/° F.

BRIEF DESCRIPTION OF THE DRAWINGS

Illustrative embodiments of the present invention will be described with reference to the appended drawings wherein.

To facilitate an understanding of the present invention, similar reference numerals are used, where possible, to designate like elements in the figures.

DETAILED DESCRIPTION

Figure 1A:
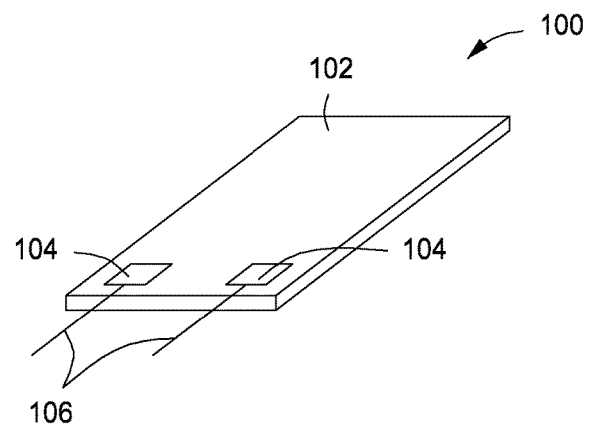
FIG. 1A illustrates a perspective view of a film RTD in accordance with the invention.

With reference to FIG. 1A, the RTD 100 has a conductive element 102 that is a metal film formed by known methods; however, the metal is a pure metal or an alloy having the electrical properties discussed below. The RTD 100 has connection pads or points 104 that are electrically associated with leads 106. One of the leads 106 transmits an input signal, for example a first voltage to the conductive element 102, and the lead 106 transmits an output signal, for example a second voltage which has been modified by the resistance of conductive element 102.

Figure 1B:
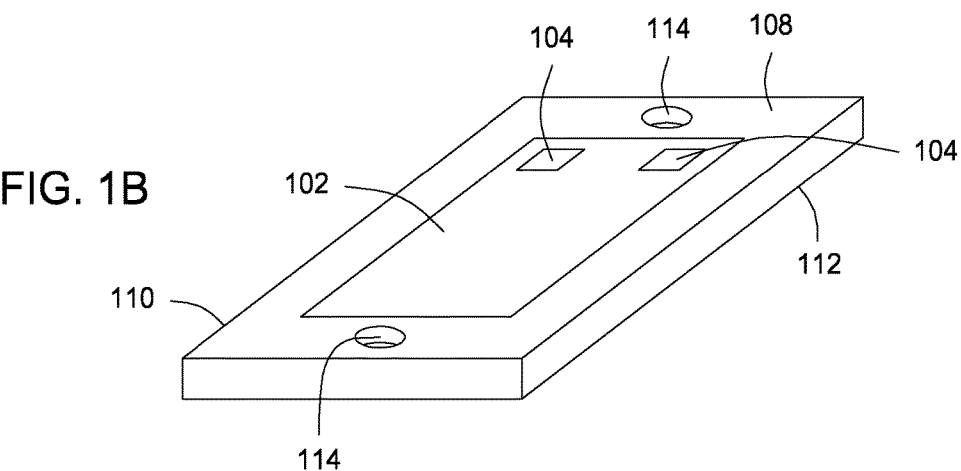
FIG. 1B illustrates a perspective view of the film RTD of FIG. 1 fixed to a substrate.

With reference to FIG. 1B, the conductive film 102 can be formed by known methods on one surface 108 of a substrate 110. The substrate 110 can be a film or a plate, which is adapted to be fixed to a test article. The second surface 112 of the substrate 110 can be adapted for fixing the substrate 110 to a test article for temperature detection, such as by an adhesive agent, such as glue, or welding, or with mechanical attachment elements, such as threaded fasteners or rivets, as may be required by the environment.

Figure 2:
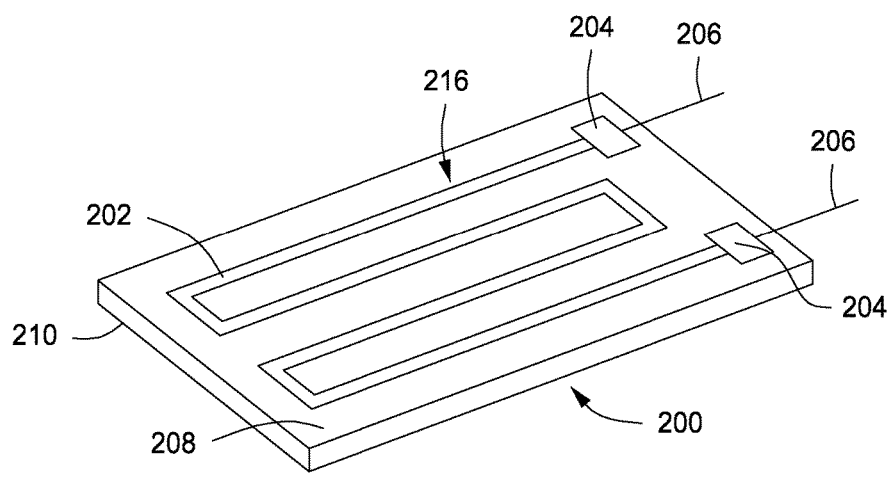
FIG. 2 illustrates a perspective view of another RTD in accordance with an embodiment of this invention.

With reference to FIG. 2, there is illustrated an RTD 200 comprising a conductive element or conductive film 202 that is formed in the serpentine pattern or circuit 216 shown on a first surface 208 of the substrate 210. The illustrated pattern or circuit 216 can be formed using known methods. The connection pads or points 204 are electrically associated with leads 206. The circuit 216, in the desired conductive element or conductive film 202, is one surface of the substrate 210, which is similar to substrate 110 in its function and attachment to a test article.

Figure 3A:
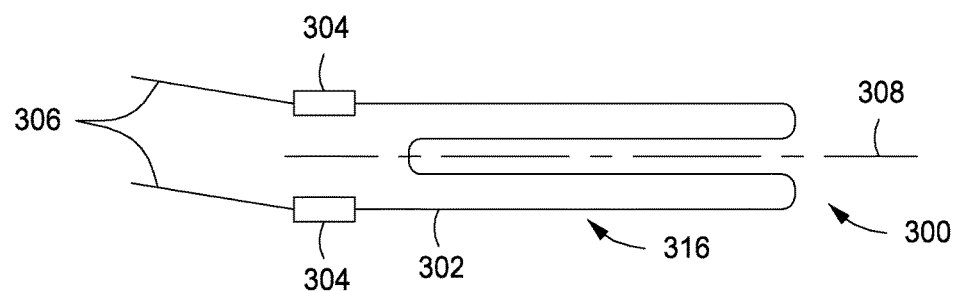
FIG. 3A illustrates a top plan view of an RTD circuit in accordance with an embodiment of this invention; and, FIG. 3B illustrates a top view of another RTD circuit in accordance with an embodiment of this invention.
Figure 3B:
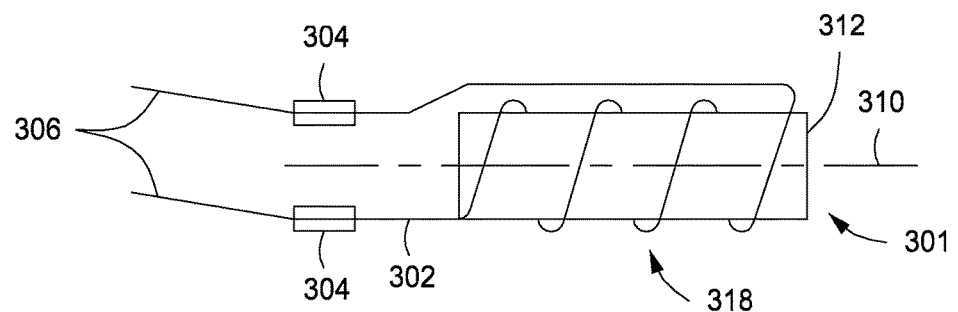

With reference to FIGS. 3A and 3B, there are illustrated RTDs made in accordance with another embodiment of the invention. In FIG. 3A, RTD 300 includes a metal wire conductive element 302 formed in a serpentine circuit or path 316 with a major axis aligned with the longitudinal axis 308 of the RTD 300. In FIG. 3B, RTD 301 includes a circuit 318 of a metal wire 302 with a major axis aligned with the longitudinal axis 310 of the RTD 301. In this embodiment, the wire 302 has a portion that is wound around a support 312. In a preferred embodiment, the metal wire 302 is wound helically around the support 312. Preferably, support 312 can structurally support and separate the coils of the circuit 318 and is suitable for use at the required operating temperature range, typically from about −320° F. to about 450° F.

In the embodiments illustrated in FIGS. 3A and 3B, the conductive element has electrical terminations as previously discussed that are arranged for the desired end use.

The conductive elements 102, 202, and 302, in each of the illustrated embodiments of the invention are formed from a pure metal or a metallic alloy having a temperature coefficient of resistance (TCR) that is between about 10 ppm/° F. and 1,000 ppm/° F. This TCR range differs significantly from the TCR range associated with conventional RTDs. For example, the TCR of the conductive element of conventional RTDs formed from pure platinum metal is about 2100 ppm/° F. Other conventional RTDs have conductive elements formed from pure nickel that has a TCR of about 3300 ppm/° F. The conductive element of this invention can have a TCR of two orders of magnitude less than the conductive elements in known RTDs.

Through experimentation and analysis, the inventors observed that, contrary to conventional practice, metals within the above-described TCR ranges provided benefits when used for a conductive element in an RTD. Metals within the above-described TCR ranges are herein after referred to as "select metals." The inventors observed that conductive elements formed from select metals produced a more controlled response to a change in conductor temperature than conventional RTDs. In addition, responses to a temperature change in the required operating temperature range, typically from about −320° F. to about 450° F., are within the readable range of currently available data acquisition equipment without the need for an attenuation circuit. The inventors also observed that some select metals have a sufficiently linear resistance response to temperature change to yield accurate temperature measurements without a conditioning circuit to linearize the response signal. Preferably, a select metal has a linearity between about 0% and about 0.01% over a temperature range from about −40° F. to about 248° F.

The inventors observed that the output signal from an RTD having a select metal conductive element fell within the general range of strain gage output. This observation led the inventors to experiment by directly connecting the output signal from select metal RTDs to strain measurement instrumentation. Another benefit of an RTD having a select metal conductive element is that the RTD obviates the need for a dedicated temperature channel in the instrument. The disclosed RTD can be electrically coupled directly to a strain channel of a data acquisition instrument and the temperature sensed by the RTD can be read directly by the instrument. Because the response signal is significantly less than that from a conventional RTD, an attenuation circuit is not necessary.

The select metals include alloys of nickel and chromium (NiCr) which have been produced with a TCR of approximately 50 ppm/° F., and alloys of iron, nickel, and chromium (FeNiCr) and platinum and tungsten (PtW) both of which have been produced with a TCR of approximately 250 ppm/° F. NiCr alloys with an approximate composition of 80% Ni and 20% Cr, FeNiCr alloys with an approximate composition of 36% Ni, 57% Fe, and 7% Cr, and PtW alloys with an approximate composition of 92% Pt and 8% W have been observed to have TCRs within the specified range. Beneficially, these alloys also appear to have an approximately linear resistance response to temperature change (e.g., approximately 0% to 0.01%) over a temperature range from about −40° F. to about 248° F.

What is claimed is:

1. A resistance temperature detector (RTD), comprising: a temperature sensing circuit including a first connection point for a first lead formed from a first material and a second connection point for a second lead formed from the first material, and having a single conductive element extending from the first connection point to the second connection point, the conductive element is formed from a metal having a temperature coefficient of resistance (TCR) from about 10 ppm/° F. to about 1000 ppm/° F.

2. The RTD of claim 1, wherein the metal that the conductive element is formed from is an alloy of nickel and chromium, the conductive element having a temperature coefficient of resistance of approximately 50 ppm/° F.

3. The RTD of claim 1, wherein the metal that the conductive element is formed from is an alloy of iron, nickel, and chromium, the conductive element having a temperature coefficient of resistance of approximately 250 ppm/° F.

4. The RTD of claim 1, wherein the metal that the conductive element is formed from is an alloy of platinum and tungsten, the conductive element having a temperature coefficient of resistance of approximately 250 ppm/° F.

5. The RTD of claim 1, wherein the metal that the conductive element is formed from has a resistance response having a linearity of 0.0% to 0.01% over a temperature range from about −40° F. to about 248° F.

6. The RTD of claim 1, wherein the conductive element is a conductive film.

7. The RTD of claim 6, wherein the conductive film is formed on a first surface of a substrate.

8. The RTD of claim 7, wherein the substrate is adapted for fixing to a test article.

9. The RTD of claim 8, wherein a second surface of the substrate is adapted for bonding to the test article with an adhesive agent.

10. The RTD of claim 8, wherein the substrate is adapted for fixing to the test article by welding.

11. The RTD of claim 8, wherein the substrate is adapted for fixing to the test article by mechanical fasteners.

12. The RTD of claim 7, wherein the conductive film is formed in a pattern on the first surface of the substrate.

13. The RTD of claim 1, wherein the conductive element is a wire formed as a serpentine circuit.

14. The RTD of claim 1, wherein the conductive element is a coiled wire.

15. The RTD of claim 14, wherein the wire is coiled at least partially around a support.

16. The RTD of claim 14, wherein the coiled wire is at least partially wrapped around a support.

17. The RTD of claim 1, wherein the metal is an alloy of elements selected from the group consisting of nickel and chromium, iron, nickel and chromium, platinum and tungsten, and combinations thereof.

18. The RTD of claim 1, wherein the temperature sensing circuit produces a resistance response which is configured for reading by a data acquisition instrument directly connected to the first connection point and the second connection point, without a conditioning circuit.

* * * * *